United States Patent [19]
Strand et al.

[11] Patent Number: 6,116,824
[45] Date of Patent: Sep. 12, 2000

[54] CUTTING INSERT FOR A MILLING CUTTER, AND A METHOD OF PREVENTING ACCIDENTAL DISLODGEMENT OF CUTTING INSERTS

[75] Inventors: Bengt Strand, Fagersta; Stefan Hedberg, Hedemora, both of Sweden

[73] Assignee: Seco Tools AB, Fagersta, Sweden

[21] Appl. No.: 09/258,800

[22] Filed: Feb. 26, 1999

[30] Foreign Application Priority Data

Mar. 10, 1998 [SE] Sweden .................................. 9800762

[51] Int. Cl.⁷ ........................................................ B23C 5/20
[52] U.S. Cl. .............................. 407/40; 407/41; 407/47; 407/114; 407/116
[58] Field of Search .................................. 407/40, 41, 42, 407/43, 47, 49, 33, 114, 115, 116; 82/1.11

[56] References Cited

U.S. PATENT DOCUMENTS

| | | |
|---|---|---|
| 4,843,928 | 7/1989 | Wale et al. ............................. 407/40 X |
| 4,966,500 | 10/1990 | Tsujimura et al. . |
| 5,147,158 | 9/1992 | Rivére . |
| 5,454,670 | 10/1995 | Noda et al. .......................... 407/114 X |
| 5,494,383 | 2/1996 | Kress et al. ........................... 407/114 X |
| 5,597,270 | 1/1997 | Marin ..................... 407/47 X |
| 5,827,016 | 10/1998 | Strand ................. 407/116 X |
| 5,915,889 | 6/1999 | Kress et al. ......................... 407/116 X |

*Primary Examiner*—Henry W. H. Tsai
*Attorney, Agent, or Firm*—Burns, Doane, Swecker & Mathis, L.L.P.

[57] ABSTRACT

A milling cutter includes a holder and cutting inserts held in the holder by fasteners. Each cutting insert has an octagonal basic shape and includes eight cutting edges created by the intersection between an upper face and an edge face of the insert. The fasteners bear frictionally against the upper faces of respective inserts. The upper face comprises a number of safety stop projections. In the event that the insert slips relative to the fastener during a milling operation, one of the safety stop projections abuts the fastener to prevent accidental dislodgement of the insert.

17 Claims, 4 Drawing Sheets

FIG. 1B
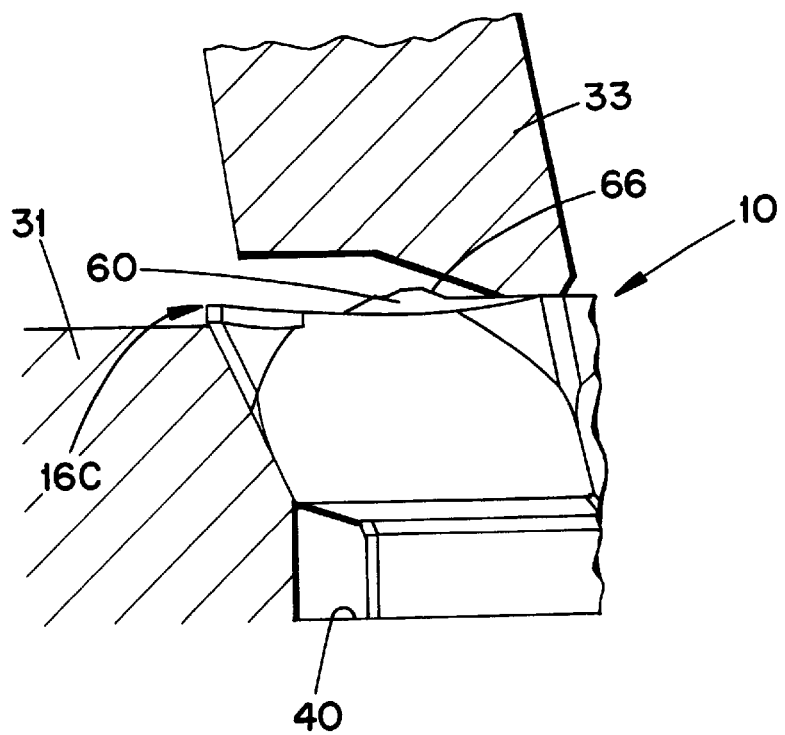
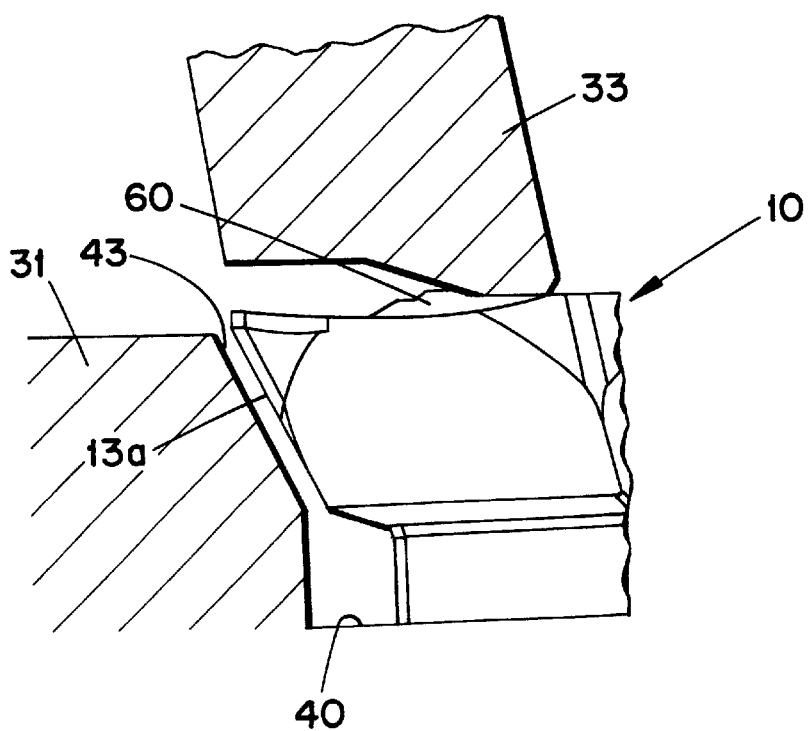
FIG. 1C

FIG. 2A
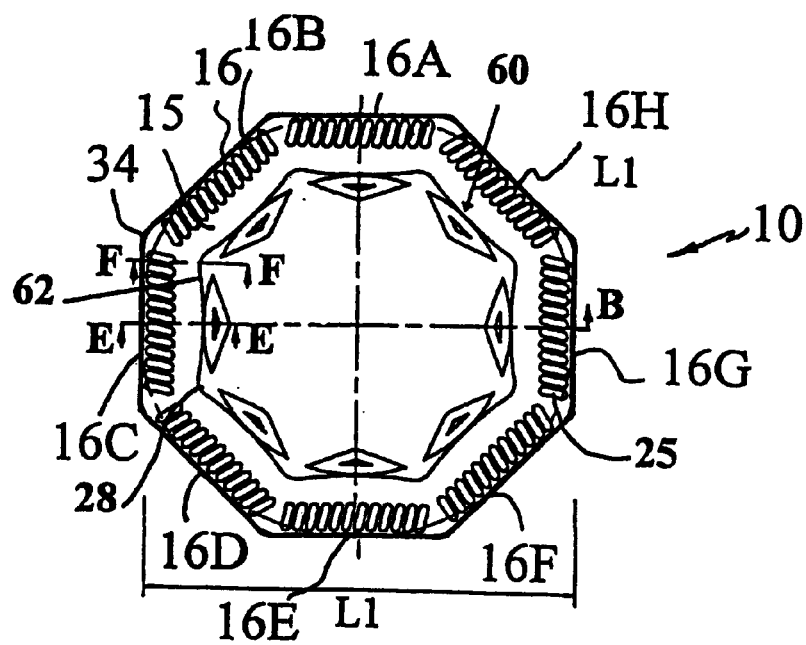
FIG. 2B
FIG. 2D
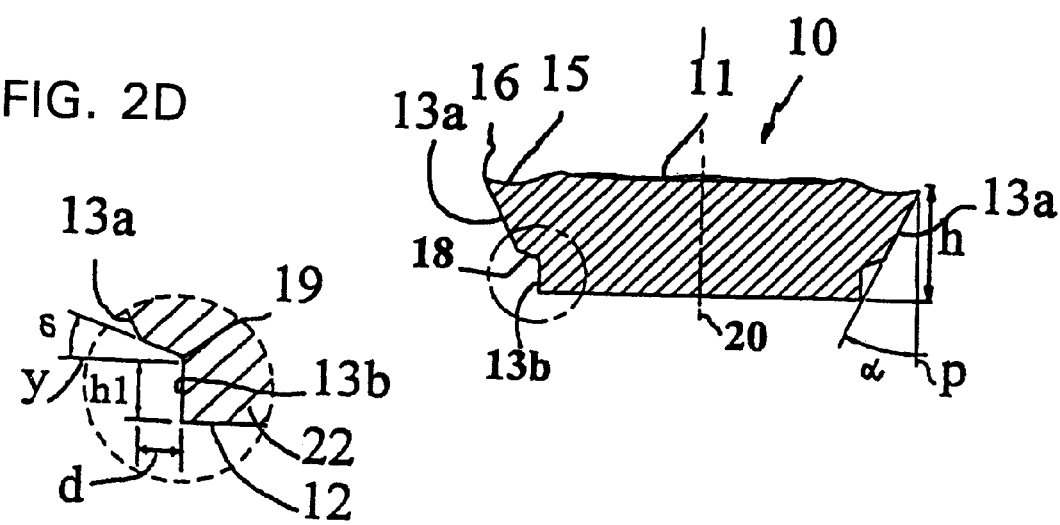

FIG. 2C
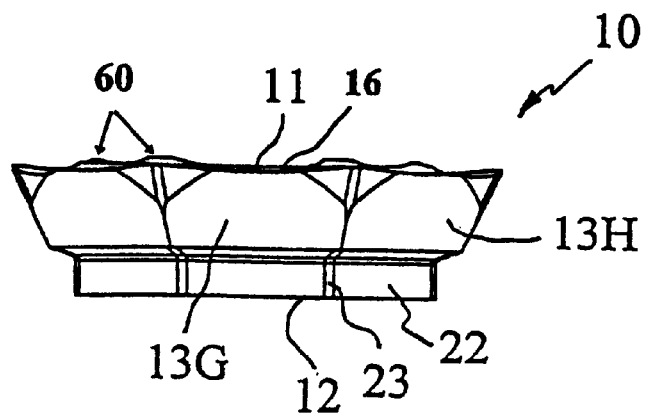
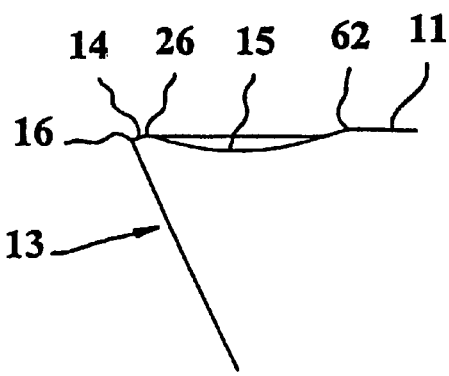
FIG. 2F
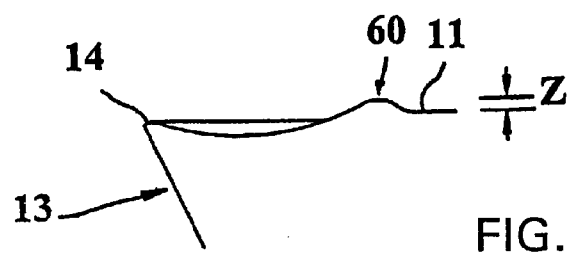
FIG. 2E

CUTTING INSERT FOR A MILLING CUTTER, AND A METHOD OF PREVENTING ACCIDENTAL DISLODGEMENT OF CUTTING INSERTS

FIELD OF THE INVENTION

The present invention relates to a cutting insert, a milling cutter, and a method of retaining the inserts against accidental dislodgement from the cutter.

BACKGROUND OF THE INVENTION

In tools for metal cutting having indexable cutting inserts of hard and wear resistant material, the cutting edges are subjected to wear, and sometimes some part of or the entire cutting edge collapses. If a small insert fractures, only the cutting edge collapses without any risk for damage to the tool body. If a large insert fractures, however, the risk of damage to the tool body increases to an essential degree. If the cutting insert is not seated on a shim, then a fracture of the insert often gives rise to damage of the tool body. To avoid such damage, it is usual to rest the cutting insert on a shim of cemented carbide. A usual combination is a cutting insert having a thickness of about 5 mm and a shim having a thickness of 3–5 mm. This results in a total thickness of the cutting insert and the shim of 8–10 mm.

In U.S. Pat. No. 5,147,158 there is depicted a four-sided cutting insert having an integrated shim so as to provide a fracture zone. The cutting insert comprises an upper rake face, a lower face, and an edge clearance face interconnecting said upper and lower faces. The edge clearance face includes a step located intermediate the upper and lower faces. When the insert is in use, the step defines a zone with a strain peak such that in the event of insert breakage, the propagation of the crack will be guided to the area of the step. The portion of the insert located below the step remains intact and thus protects the tool body.

U.S. Pat. No. 4,966,500 shows a milling cutter having octagonal or hexagonal cutting inserts. Each cutting insert has a segmented (non-linear) major cutting edge, an end cutting edge and a radially inner cutting edge. The radially inner cutting edge is supposed to cut during coring of the work piece. The known insert lacks fracture zones so as to prevent an insert breakage from transferring into the seat or shim. During use of such a known insert, it has happened that the insert has been thrown radially outwardly due to excessive centrifugal forces, thereby creating hazards for the environment.

OBJECTS OF THE INVENTION

One object of the present invention is to present a cutting insert and a milling tool that overcome the disadvantages discussed above.

Another object of the present invention is to provide a cutting insert and a milling tool providing a safe environment when in use.

Still another object of the present invention is to provide an economically favorable cutting insert providing six or eight edges.

These and other objects are realized by a milling cutter and a cutting insert that has been given the characteristics of the appended claims.

SUMMARY OF THE INVENTION

The present invention relates to a milling insert, a milling tool, and a method of preventing accidental dislodgement of milling inserts from a milling cutter.

The milling insert is of generally polygonal and basic shape and comprises an upper face and an edge face intersecting one another to form a plurality of cutting edges. The upper face includes chip faces situated inwardly of respective cutting edges. The chip faces define rake faces. The edge face defines a clearance face forming an acute clearance angle with a plane oriented parallel to a center axis of the insert. The upper face includes a plurality of safety stop projections which are situated inwardly of respective chip faces, and also situated outwardly of a gripped portion of the upper face, i.e., a portion adapted to be gripped frictionally by a fastener. The safety stop projections extend higher than the upper face to abut the fastener if the insert slips during a milling operation.

The milling cutter comprises a rotatable holder carrying a plurality of the above-described milling inserts, and a plurality of fasteners for fastening respective inserts to the holder.

The method aspect of the invention comprises the steps of:

A) inserting each milling insert into a respective pocket of the holder;

B) installing fasteners onto the holder such that each fastener frictionally engages a section of an upper face of a respective insert located inwardly of a safety stop projection disposed on the upper face of the insert; and C) causing the safety stop projection to abut the fastener in the event of slippage of the insert relative to the fastener during a milling operation.

BRIEF DESCRIPTION OF THE DRAWINGS

The objects and advantages of the invention will become apparent from the following detailed description of a preferred embodiment thereof in connection with the accompanying drawings, and in which:

FIGS. 1B and 1C schematically show two possible positions of the insert in the milling cutter body.

FIG. 2A shows a plan view of a cutting insert according to the present invention.

FIG. 2B shows a section along line E–B in FIG. 2A.

FIG. 2C shows the insert in a side view.

FIG. 2D shows a magnified portion of a lower corner of the insert in FIG. 2B.

FIGS. 2E and 2F show cross-sections according to the lines E—E and F—F, respectively in FIG. 2A.

DETAILED DESCRIPTION OF A PREFERRED EMBODIMENT OF THE INVENTION

Figure 1A:
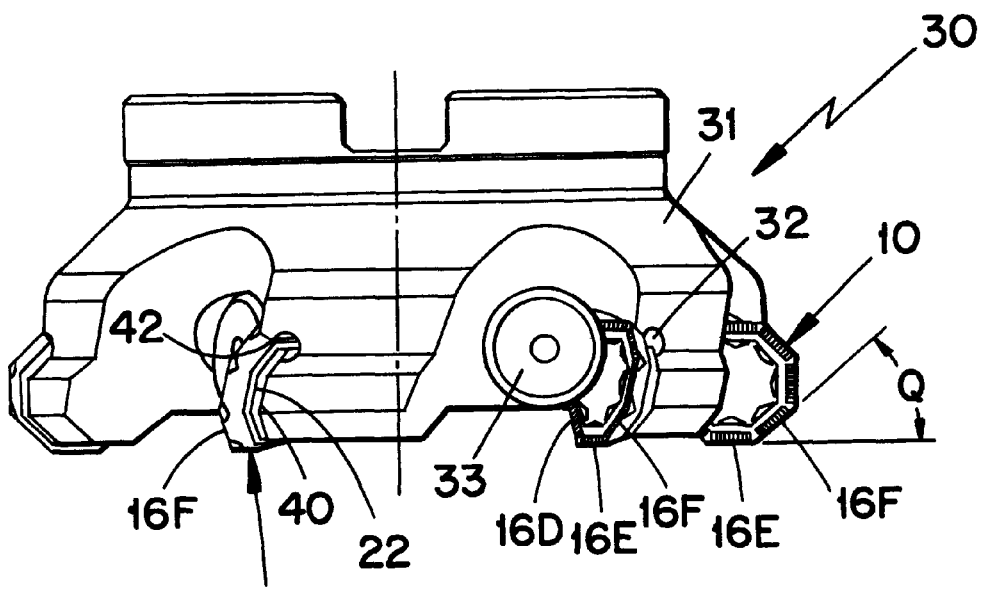
FIG. 1A shows an embodiment of a milling cutter according to the present invention, in a side view.
Figure 2G:
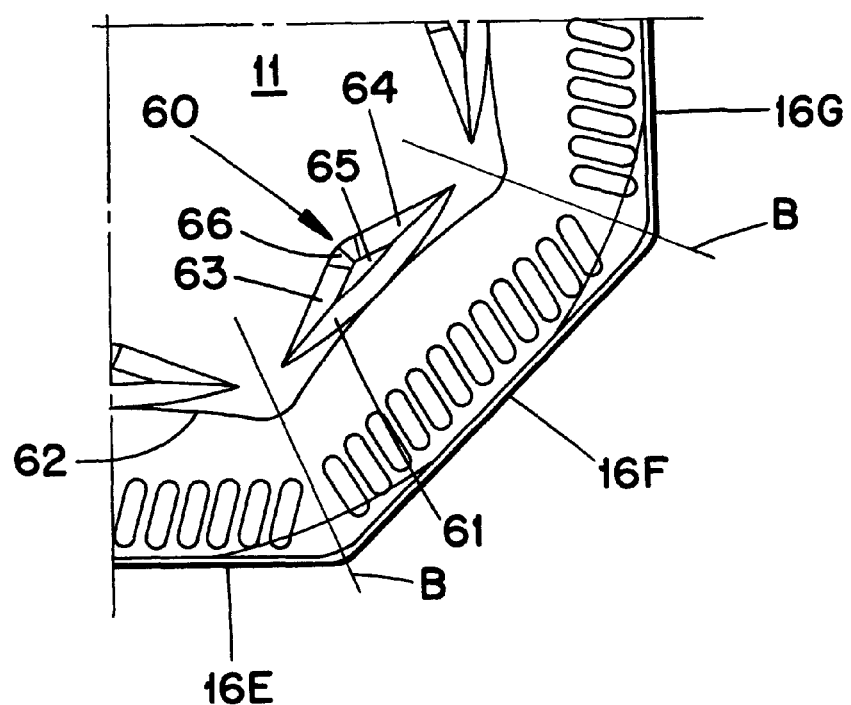
FIG. 2G shows a magnified quarter of the insert of FIG. 2A.

FIG. 1A shows a milling cutter 30 according to the present invention, including a tool holder 31 and cutting inserts 10. The holder 31 is a milling cutter body which has a number of pockets 32 for receiving respective cutting inserts. Each pocket comprises a substantially planar base 40 and two shoulders, i.e., one axially facing shoulder 42 (FIG. 1A) and one radially facing shoulder 43 (FIG. 1C). The shoulders are oriented substantially perpendicular to each other. Each shoulder 43 is arranged to abut a corresponding upper portion 13a of the insert 10. A threaded boring is provided in the vicinity of the pocket 32 so as to receive a fastening screw 33 to frictionally grip and force the insert towards the shoulders 42, 43 and the base 40, via a radially outer part of the screw head. When the insert is to be indexed, the screw 33 is partially unscrewed until the cutting insert can be pulled by hand radially outwardly and rotated by an increment corresponding to 45° counter-clockwise, so that a fresh secondary cutting edge 16E assumes a cutting position. Then the insert is pushed into the pocket and the screw is tightened again. The edge 16D is preferably passive and does not cut during milling. The inserts 10 will be located in the holder at a setting angle Q of about 43° to obtain a clearance angle of about 2° for the secondary cutting edge 16E of the insert 10.

The cutting insert 10 depicted in FIGS. 2A to 2D has a generally octagonal basic shape and includes an upper face 11, a lower face 12 and an edge face 13 generally interconnecting the upper and lower faces 11 and 12. The cutting insert 10 has a positive geometry, i.e., an upper portion 13a of the edge face defines a clearance face and forms an acute angle with the upper face 11, the latter being a rake face. The upper face 11 includes a chip upsetting face 14 located at the periphery of the insert 10. The upper face 11 furthermore includes a chip face 15 sloping inwardly and downwardly from the chip upsetting face 14. The latter faces constitute the most peripheral part of the upper face 11. The intersecting line between the chip upsetting face and the edge face 13 forms the overall cutting edge structure 16, which is defined by eight cutting edges 16A–16H. The chip face 15 is concavely curved and extends inwardly from the chip upsetting face from a transition edge 26 therewith. A ridge is provided at the intersection of adjoining pairs of the chip faces 15 so as to strengthen the respective insert corner 34 and to form any chips that are generated at the corner 34. A plurality of projections or preferably depressions 25 are formed in the chip face 15, the projections or depressions 25 being spaced apart along the transition edge 26. The projections or depressions 25 preferably intersect the transition edge 26 and extend inwardly therefrom in a direction non-perpendicularly to the associated cutting edge 16 as said insert is viewed in plan. Each projection or depression thereby forms, as seen in plan, an angle in the range of 15° to 40° relative to a line extending normal to the associated clearance face 13. The effect of such design is to minimize heat transfer from the chip to the insert.

Respective pairs of adjacent cutting edges meet to form respective ones of the cutting corners 34, the corners having an internal obtuse angle, about 135°. Each cutting edge is, as seen in a bottom view, generally parallel to the adjacent lower portion 13b of each segment of the edge face, which portion 13b defines an outer periphery of an integral shim 22. Each cutting edge is concavely curved when seen in a side view, such that the mid section of the edge is disposed closer to the lower side 12 than are the end sections thereof.

The edge face 13 includes eight segments associated with respective cutting edges. The upper portion 13a of each segment of the edge face 13 forms a clearance angle a with a plane P oriented parallel to a center axis 20 of the insert (FIG. 2B). The clearance angle a is at least 20°, preferably at least 25°. The distance between two diametrically opposed major cutting edges, e.g., edges 16C and 16G, is depicted by numeral L1 in FIG. 2A. The distance L1 is the same for all combinations of diametrically opposed major cutting edges.

The eight, planar edge surfaces 13 taper towards the lower face 12, and imaginary extensions of the surfaces 13 generally intersect at the center line 20 of the cutting insert 10 at a location below the lower face 12.

Each segment of the edge face 13 is provided with a downwardly facing shoulder forming a step 18. The upper or first portion 13a of the segment is located above the step 18 and has a positive geometry in order to provide the necessary clearance angle. The lower or second portion 13b of the segment forms a peripheral edge of the shim 22, which shim is of integral one-piece construction with the upper part of the insert. The shim 22 forms the lower face 12 of the insert. The second portion 13b of each segment has a negative geometry, i.e. the second portion 13b is perpendicular to the lower face 12 and thus forms no clearance angle. Each second portion 13b lies radially inside of an imaginary extension of the associated first portion. That is, the second portions 13b do not need to be ground if the clearance faces 13a are ground, thereby saving energy. Furthermore the step 18 will then be sufficiently large in the radial direction to provide for a favorable control of any cracks emanating during machining. That is, in the event that a fracture occurs which results in a breakage of a cutting edge, the step 18 provides a sharp inner corner 19 that constitutes an exit zone for the fracture that controls the break and leaves the lower portion of the cutting insert undamaged. By the term "sharp" is here meant that the corner is intentionally weakened by having a radius of 0 to 0.3 mm, preferably about 0.2 mm. The second or lower portion 13b thus protects the tool body.

Directing attention to FIG. 2B and 2D the following is to be said. The height $h_1$ of the lower portion 13b is in the range of 15–60% of the insert height h, preferably about 25%. This is possible since the anvil or shim constitutes an integral part of the cutting insert 10, i.e. the height $h_1$ corresponds to the height of the integrated shim 22. In order to achieve a good function of the cutting insert 10 it is necessary that the height $h_1$ does not constitute too big a part of the height h since, otherwise, the strength of the cutting edge would be too low. That could result in fracturing of the cutting edge at small loads. The smallest radial distance d from the step 18 to the lower portion 13b in the plane of the lower face 12 depends on the clearance angle. The distance d in FIG. 2D is in the interval 0.01–1.0 mm, preferably about 0.1 mm.

The lower portion 13b is about parallel with the center axis 20. The step 18 forms an angle δ with a line extending perpendicular to the center axis 20. The angle δ is 0° to 30°, and preferably about 20°.

Eight lower portions 13b are formed around the periphery of the shim 22. Each pair of adjacent portions 13b meet at a corner 23 forming an internal obtuse angle of about 135°. The corners project radially relative to the rest of the second portions 13b. The periphery of the shim part 22 describes a path of increasing and decreasing radial distances from the center axis 20 of the insert.

The upper face 11 furthermore, includes a number of safety stop projections 60 associated with respective cutting edges 16A–H. Each projection 60 is provided radially inside the chip face 15, and thus the projection 60 is provided substantially radially inside the step 18. The projection 60 does not intersect the bisectors B of the adjacent corners 34 so as to facilitate the alternative use of a wedge type of fastener for holding the insert instead of the screw 33. In a top view (FIG. 2G) the projection 60 is of a generally triangular shape. The base flank 61 of the triangle is somewhat convex and preferably touches a radially inner edge 62 of the chip face 15. The base flank 61 is connected to substantially identical flanks 63, 64. The flanks 63, 64 and the base flank 61 connect to a substantially planar surface 65 at a location above the surface 11, which surface 65 is of smaller area than the area at the intersection of the surface 11 and the projection 60. The flanks 63, 64 adjoin each other along a ridge 66, which is supposed to abut against the screw 33 under certain circumstances, as explained below. The height Z of the projection 60 is about 0.1–0.3 mm.

In FIGS. 1A and 1B it is shown how the insert 10 usually is clamped in the milling cutter body. That is, the upper portion 13a of the insert 10 abuts against the radially facing shoulder 43 while resting on the base surface 40. If however, the frictional force between the screw 33 and the upper surface 11 is overpowered by centrifugal force, the position shown in FIG. 1C arises. That is, the insert will travel radially outwardly until the ridge 66 of the projection 60 abuts against the screw 33. Any further movement of the insert will be stopped by the interaction between the projection 60 and the screw 33. The projection 60 thus safeguards the insert from being dislodged and thrown outwardly if the centrifugal force is sufficiently large. It should be noted that only the projection 60 located adjacent the passive edge 16C which faces towards the radial shoulder 43 performs a function during milling, while the other projections do not perform any function. By the term "passive" is here meant that the connected cutting edge is not in cutting position.

By applying the teachings of the present invention a cutting insert and a milling tool providing an economically favorable cutting insert having at least six cutting edges are provided. The milling tool is safe to operate. In addition, by providing the insert with an integral shim, defined by a sharp corner, the possible cracks will be stopped from propagating into the holder body. The present invention provides an economical solution to the user, by having eight cutting edges and by saving holder bodies. In addition, the tool according to the present invention cuts in an easy manner through the workpiece metal which is especially important when a thin flange shall remain connected to the work piece of aluminum, for example.

Although the present invention has been described in connection with a preferred embodiment thereof, it will be appreciated by those skilled in the art that additions, deletions, modifications, and substitutions not specifically described may be made without departing from the scope of the invention as defined in the appended claims. For instance, the insert 10 may alternatively have a different polygonal basic shape such as square or hexagonal basic shape to provide four or six cutting edges, respectively.

What is claimed is:

1. A milling insert of generally polygonal basic shape comprising an upper face and an edge face intersecting one another to form a plurality of cutting edges; the upper face including chip faces situated inwardly of respective cutting edges, said chip faces defining rake faces; the edge face defining a clearance face forming an acute clearance angle with a plane oriented parallel to a center axis of the insert; a plurality of safety stop projections disposed on the upper face and situated inwardly of respective chip faces and outwardly of a planar center portion of the upper face adapted to be engaged frictionally by a fastener, said planar center portion disposed higher than the chip faces, said safety stop projections extending higher than the center portion to abut the fastener when the insert slips during a milling operation.

2. The milling insert according to claim 1 wherein adjacent ones of the cutting edges intersect one another to form respective corners of the insert, each safety stop projection situated between imaginary bisectors of an adjacent pair of the corners.

3. The milling insert according to claim 2 wherein the insert further includes a lower face, the edge face being recessed adjacent the lower face to form a downwardly facing step defining an exit zone for fractures.

4. The milling insert according to claim 1 wherein each safety stop projection is of generally triangular shape as viewed in a direction perpendicular to the upper surface.

5. The milling insert according to claim 4 wherein each chip face forms an inner edge, the safety stop projection including three flanks, a first of the flanks being generally convex and substantially touching the inner edge of a respective chip face.

6. The milling insert according to claim 5 wherein second and third flanks of the safety stop projection converge toward one another in a direction away from a respective cutting edge and intersect to form a ridge.

7. The milling insert according to claim 6 wherein the first, second, and third flanks converge upwardly away from the upper face and meet at a substantially planar surface of the safety stop projection; a height of the substantially planar surface above the upper face being in the range of 0.1 to 0.3 mm.

8. The milling insert according to claim 3 wherein a smallest distance from the lower face to the step is in the range of 15 to 60% of a distance from the lower face to the cutting edge.

9. A milling cutter comprising a rotatable holder, a plurality of milling inserts, and a plurality of fasteners for fastening respective inserts to the holder; said holder including a plurality of pockets receiving respective ones of the milling inserts; each pocket including a radially outwardly facing shoulder; each insert being of generally polygonal basic shape, and including an upper face and an edge face intersecting one another to form a plurality of cutting edges; the upper face including chip faces defining rake faces situated inwardly of respective cutting edges; the edge face defining clearance faces for respective cutting edges; each of the clearance faces forming an acute clearance angle with a plane oriented parallel to a center axis of the insert; each fastener frictionally engaging a planar center section of the upper face to secure the respective insert in place; a plurality of safety stop projections disposed on the upper face and situated inwardly of respective chip faces and outwardly of the section of the upper face engaged by the fastener, the safety stop projection extending higher than the section of the upper face to abut the fastener in the event of insert slippage during a milling operation.

10. The milling cutter according to claim 9 wherein adjacent ones of the cutting edges intersect one another to form respective corners of the insert, each safety stop projection situated between imaginary bisectors of an adjacent pair of the corners.

11. The milling cutter according to claim 10 wherein the insert further includes a lower face, the edge face being recessed adjacent the lower face to form a downwardly facing step defining an exit zone for fractures.

12. The milling cutter according to claim 9 wherein each safety stop projection is of generally triangular shape as viewed in a direction perpendicular to the upper surface.

13. The milling cutter according to claim 9 wherein each chip face forms an inner edge, the safety stop projection including three flanks, a first of the flanks being generally convex and substantially touching the inner edge of a respective chip face.

14. The milling cutter according to claim 13 wherein second and third flanks of the safety stop projection converge toward one another in a direction away from a respective cutting edge and intersect to form a ridge.

15. The milling cutter according to claim 14 wherein the first, second, and third flanks converge upwardly away from the upper face and meet at a substantially planar surface of the safety stop projection; a height of the substantially planar surface above the upper face being in the range of 0.1 to 0.3 mm.

16. The milling cutter according to claim 11 wherein a smallest distance from the lower face to the step is in the range of 15 to 60% of a distance from the lower face to the cutting edge.

17. A method of preventing accidental dislodgement of milling inserts from a rotatable holder of a milling cutter, comprising the steps of:

A) inserting each milling insert into a respective pocket of the holder;

B) installing fasteners onto the holder such that each fastener frictionally engages a section of an upper face of a respective insert at a location disposed inwardly of a safety stop projection situated on the upper face of the insert; and C) causing the safety stop projection of an insert to abut a respective fastener in the event of slippage of the insert relative to the fastener during a milling operation.

* * * * *